Jan. 23, 1962  G. O. DOHERTY ETAL  3,017,884
APPARATUS FOR INJECTING OR INFUSING FLUIDS INTO
PATIENTS AND METHOD OF MAKING SAME
Filed May 1, 1958  3 Sheets-Sheet 1
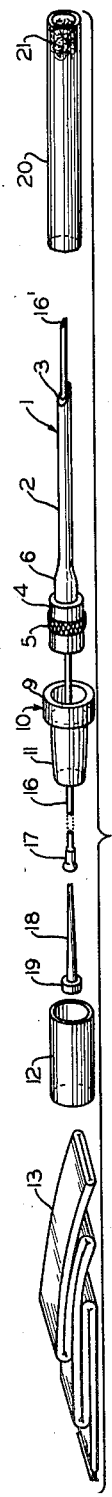
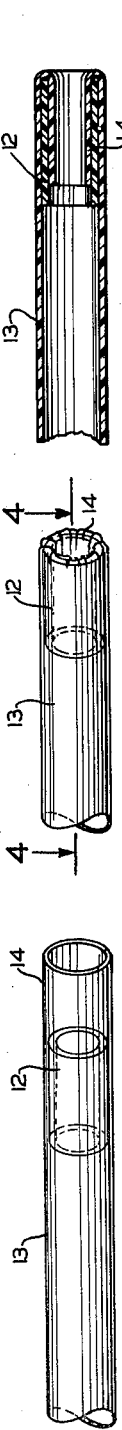
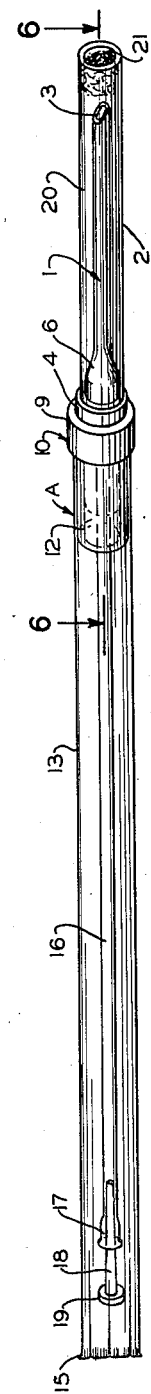
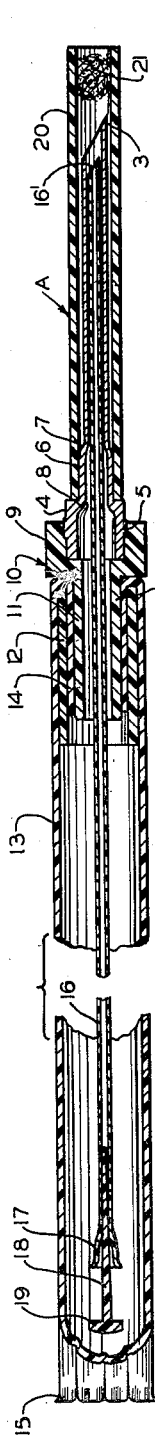
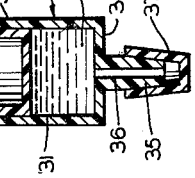
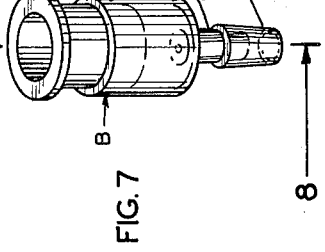
INVENTORS.
DALE H. BALLARD
GEORGE O. DOHERTY
BY
ATT'Y.

Jan. 23, 1962 G. O. DOHERTY ETAL 3,017,884
APPARATUS FOR INJECTING OR INFUSING FLUIDS INTO
PATIENTS AND METHOD OF MAKING SAME
Filed May 1, 1958 3 Sheets-Sheet 2

INVENTORS.
DALE H. BALLARD
GEORGE O. DOHERTY
BY
ATT'Y.

Jan. 23, 1962 G. O. DOHERTY ETAL 3,017,884
APPARATUS FOR INJECTING OR INFUSING FLUIDS INTO
PATIENTS AND METHOD OF MAKING SAME
Filed May 1, 1958 3 Sheets-Sheet 3

INVENTORS
DALE H. BALLARD
GEORGE O. DOHERTY
BY
ATT'Y.

United States Patent Office 3,017,884
Patented Jan. 23, 1962

3,017,884
APPARATUS FOR INJECTING OR INFUSING FLUIDS INTO PATIENTS AND METHOD OF MAKING SAME
George O. Doherty, 835 Teller Ave., Grand Junction, Colo., and Dale H. Ballard, 2230 S. State St., Salt Lake City, Utah
Filed May 1, 1958, Ser. No. 732,265
5 Claims. (Cl. 128—214)

This invention relates in general to certain new and useful improvements in surgical devices and, more particularly, to means for injecting or infusing fluids into patients and to methods for making the same.

The injection or infusion of fluids into a patient is used, at the present time, in a wide variety of medical and surgical procedures and such uses are increasing to a point of becoming routine in many cases. The intravenous administration of liquids such as isotonic saline solution, glucose, and the like, the giving of blood transfusions, the induction of spinal anaesthesia, and even the use of artificial kidneys or similar devices are examples of the application of injection or infusion techniques. In carrying out such procedures, it is conventional practice to insert a heavy hollow needle into the vein, artery, spine, or other affected area, and, once the needle is properly installed, some suitable fluid conduit is connected to the external end thereof. In the case of intravenous infusion, a connection is made by a Luer fitting or other similar means to rubber tubing leading to the supply-flask or bottle. Likewise, in the case of blood transfusions, the needle is suitably connected to the transfusion apparatus. Since the needle must remain in the patient's arm during the injection or infusion procedure, immobilization of the arm on an arm board or similar structure is mandatory for obvious reasons. Furthermore, in all of these standard techniques of intravenous therapy, it is necessary that the physician thoroughly scrub his hands and wear sterile rubber gloves in order to avoid contamination of the equipment.

It is also common practice to place a hollow needle in the vein of a patient's arm and leave it in position throughout a major surgical operation since these needles are frequently needed for the administration of a liquid anesthetic, stimulants, whole blood plasma, and the like during emergencies which may occur. Obviously, this operating room procedure also requires that the patient's arm be immobilized in an outstretched position on an arm board, thereby resulting in inconvenience to surgeons and nurses attending the patient during the operation. Moreover, if the operation is rather lengthly, the patient may suffer severe arm discomfort upon recovering from the anesthetic by reason of the fact that the arm has been immobilized for a long period of time.

Finally, when the operation is completed, the patient is transferred to a recovery room until the anesthetic is worn off and the danger of post-operative shock is past. However, while in the recovery room, the patient may require a blood transfusion or intravenous medication. Since it is present practice to remove the needle and arm board before the patient is lifted from the operating table, it will be necessary, under these emergency conditions, to make another venipuncture. Since venipunctures are difficult to make and require the skills of trained personnel, it is essential that the puncture be made by a physician or surgical nurse, with the result that the presence of such personnel in the post-operative room may be required for long periods of time simply because there is always the likelihood that a post-operative patient may need some type of intravenous medication or feeding.

When the patient is moved from the recovery room for post-operative care and convalescence, any needle which may have been inserted into the patient's vein in the recovery room must be removed because of the possibility that the needle might accidentally be jarred and cause further shock or injury. Moreover, the post-operative treatment of the patient in the hospital room may require intravenous feeding for some time, necessitating the presence or availability of highly trained personnel and sterile equipment whenever a venipuncture must be made. It will, therefore, be apparent that during a major surgical operation, as well as during post-operative care, it may be necessary to make several venipunctures in the patient's arm. Consequently, in cases where intravenous feeding is required for an extended period of time, it is necessary for a patient to lie with an arm outstretched and immobilized on an arm board for a number of consecutive days, resulting in patient immobility and poor patient morale.

It is the primary object of the present invention to provide an apparatus for intravenously administering fluid which can be allowed to remain in position in the patient's arm, or other area, for long periods of time, so that only a single venipuncture need be made for all the various intravenous procedures which may become necessary during the course of a particular operation or illness.

It is also an object of the present invention to provide an apparatus of the type stated which eliminates the need for immobilizing the patient's arm or other appendage and, at the same time, eliminates unnecessary loss of the patient's blood.

It is a further object of the present invention to provide an apparatus of the type stated wherein a needle need be inserted into the vein only a short distance and thereafter removed, thus materially reducing the incidence of local trauma, scarification and similar damage to the vein.

It is another object of the present invention to provide an apparatus of the type stated which readily permits the insertion of a catheter into the vein and, at the same time, is non-pyrogenic and reduces the possibility of an air embolism from entering into the vein.

It is an additional object of the present invention to provide an apparatus of the type stated which prevents coagulation of the blood within the catheter during periods where no fluid is flowing from the infusion set into the vein.

It is still another object of the present invention to provide an apparatus of the type stated which is relatively easy to use without the necessity of hand scrubbing or using sterile gloves and, at the same time, always maintains its sterile condition.

It is another object of the present invention to provide a method of making apparatus of the type stated which permits efficient and inexpensive manufacturing of said apparatus without special skill or training.

With the above and other objects in view, our invention resides in the novel features of form, construction, arrangement, and combination of parts presently described and pointed out in the claims.

In the accompanying drawings (three sheets)—

FIG. 1 is an exploded perspective view of an apparatus for intravenously administering fluid to a patient, said apparatus being constructed in accordance with and embodying the present invention;

FIGS. 2 and 3 are fragmentary perspective views showing steps in the assembly of the apparatus;

FIG. 4 is a fragmentary sectional view taken along line 4—4 of FIG. 3;

FIG. 5 is a perspective view of the assembled apparatus;

FIG. 6 is a sectional view taken along line 6—6 of FIG. 5;

FIG. 7 is a perspective view of an anticoagulant injector forming part of the present invention;

FIG. 8 is a sectional view taken along line 8—8 of FIG. 7;

Figure 9:
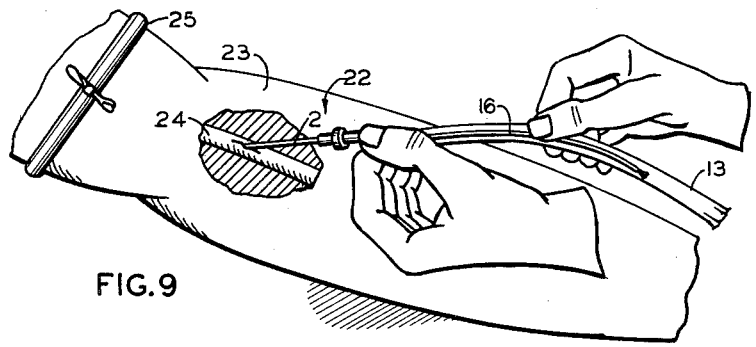
FIG. 9 is a perspective view showing the manner of inserting the catheter into the vein.

Referring now in more detail and by reference characters to the drawings, which illustrate a practical embodiment of the present invention, A designates an apparatus for intravenously administering fluid to a patient and comprising a rigid needle 1 having a hollow shank 2 terminating its forward end in a point 3, the latter being shaped for piercing the skin and vein. At its rear end, the needle 1 is formed with a diametrally enlarged hollow cylindrical hub 4, the outer periphery of which is provided with a knurl 5. Connecting the hub 4 and shank 2 is a connecting neck 6 and formed interiorly of the hub 4 and neck 6 is a pair of spaced conical shoulders 7, 8. Fitted over the hub 4 and held snugly thereon by means of the knurl 5 is the cylindrical flange 9 of a hollow polyethylene ferrule 10, the latter also having an elongated diametrally reduced shank 11. Fitted over the shank 11 is a tubular polyethylene sleeve 12 which bears endwise against the flange 9 and is of somewhat greater length than the shank 11 so as to extend rearwardly thereof, and wrapped around the sleeve 12 is a transparent pliable polyethylene sac 13 having an open end 14 which is folded or tucked back into the sleeve 12 so as to be confined between the sleeve 12 and shank 11. At its other end, the sac 13 is provided with a transverse closure seal 15. Shiftably disposed within the bore of the needle 1 and extending into the sac 13 is a flexible plastic catheter 16 preferably formed of vinyl plastic and having a forward end 16' which terminates adjacent the needle point 3. The catheter 16 is loosely disposed within the sac 13 and at its rear end the catheter 16 is provided with a flared out formed seat 17 for snugly receiving a tapered plug 18, the latter being formed with a head 19 having a diameter slightly greater than that of the bore of the shank 11, for purposes presently more fully appearing. Preferably, the needle 1 is covered with a tubular protector sleeve 20 provided adjacent the point 3 with a cotton plug 21.

In assembling the apparatus A, the catheter 16 is placed with the pliable sac 13 and, thereafter, the sleeve 12 is placed within the pliable sac 13, as shown in FIG. 2. The end 14 of the sac 13 is then folded or cuffed by a suitable instrument so as to lie along the inside face of the sleeve 12, as best seen in FIG. 4. The needle 1 and ferrule 10 are then assembled by fitting the flange 9 over the hub 4, whereupon the knurl 5 will hold the ferrule 10 firmly in place. The shank 11 is inserted within the sleeve 12 with the end 14 wedged or confined therebetween so as to hold the sleeve 12 and sac 13 snugly and retentively on the shank 11. Thereafter, the protector sleeve 20 is then placed over the needle 1 to form the completely assembled apparatus, as shown in FIG. 4, whereupon the entire apparatus A is placed within a suitable autoclave (not shown) and sterilized.

Referring now to FIGS. 7 and 8, B designates an anticoagulant injector preferably formed of polyethylene and comprising a container 30 having a chamber 31 adapted to a hold a suitable anticoagulant 32, such as heperin, sodium citrate, or the like. Fitted into the open end of the container 30 and adapted to project into the chamber 31 is a plunger 33 which fits snugly and conformably against the interior walls of the container 30 so as to form a fluid-tight seal therewith. Integrally formed on the bottom wall 34 of the container 30 is a discharge nipple 35 provided with a small capillary hole 36, the latter also being formed in the bottom wall 34, and removably disposed over the discharge nipple 35 is a protector 37.

Figure 10:
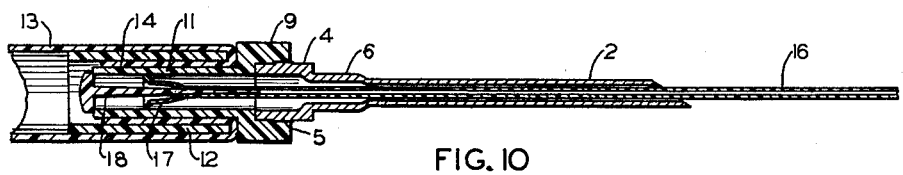
FIGS. 10 and 11 are fragmentary sectional views showing the operation of the apparatus during insertion of the catheter into the vein.

In use, the arm or other appendage 22 is externally cleaned in the area in which the penetration is to be made. The protector sleeve 20 is then removed from the needle 1 and the pointed end 3 of the needle is inserted through the skin 23 into the vein 24, utilizing a suitable tourniquet 25, the latter temporarily reducing the flow of blood through the vein 24. After the needle 1 has been inserted into the vein 24, the catheter 16 is manually manipulated by applying force from the hand of the user through the sac 13 so as to advance the catheter 16 through the needle 1 and into the vein 24. After the catheter is in position within the vein 24, the needle 1 is slowly withdrawn from the vein 24 and skin 23 and carefully moved back along the catheter, while, at the same time, digital pressure is applied to the skin 23 distal to the needle piercing point so as to hold the catheter 16 within the vein 24. The needle 1 is withdrawn until the plug head 19 abuts the shank 11, as shown in FIG. 10, whereupon movement of the needle 1 is momentarily stopped. Upon further movement of the needle 1, the plug 18 is ejected from the catheter and will fall back into the sac 13, while, at the same time, the seat-forming flared end 17 will fit snugly within the needle hub 4 and neck 6 so as to lie conformably against the shoulders 7, 8, thereby sealing the catheter 16 within the needle 1. Thereafter, the exposed portion of the catheter 16 is secured to the appendage adjacent the needle puncture by strips of tape 26, 27, after which the ferrule 10 is grasped, removing the ferrule 10, the sleeve 12, and sac 13, together with the plug 18, from the needle 1. The needle hub 4 is then attached through a suitable fitting 28 to a tube 29, the latter being suitably connected to an infusion set (not shown).

Figure 11:
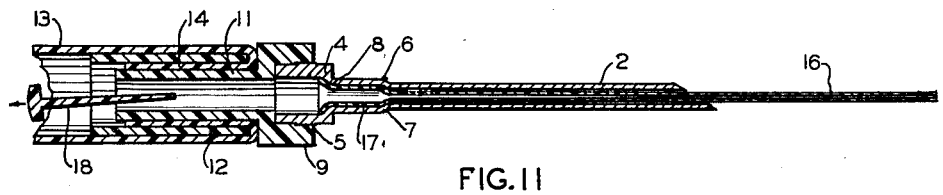
Figure 12:
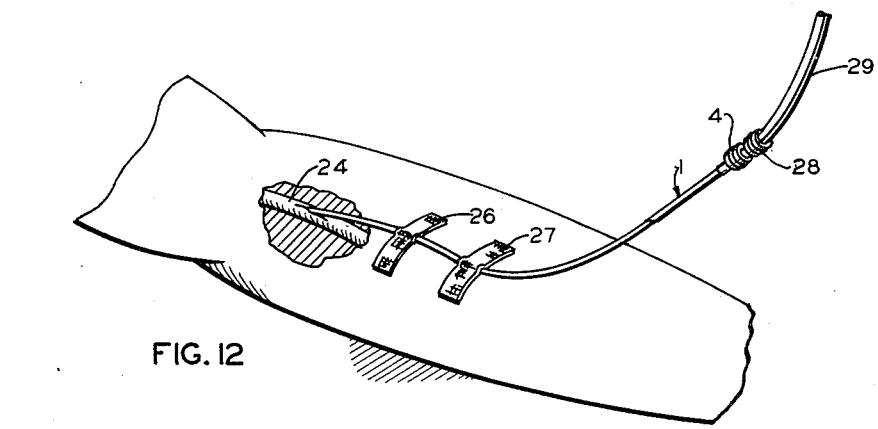
FIG. 12 is a perspective view of the apparatus after the catheter has been inserted into the vein and showing the manner of using the apparatus for intravenous feeding.

In connection with the present invention, it should be noted that, as the needle 1 punctures the vein 24, the blood pressure will cause a certain amount of blood to flow into the catheter 16, notwithstanding the presence of the tourniquet 25. As the blood flows into the catheter 16, the air therein will be slightly compressed due to the fact that the plug 18 seals off the end of the catheter 16. The amount of blood flowing into the catheter 16 will, of course, depend upon the patient's blood pressure, but will only flow up to a point where an equilibrium of pressure is established between the air within the catheter 16 and the blood. Consequently, there will be virtually no loss of blood during the time in which the catheter 16 is advanced from the sac 13 into the vein 24. As the needle 1 moves from the position shown in FIG. 10 to that shown in FIG. 11, the pulling or slight stretching force between the needle 1 and the catheter 16 causes the plug 18 to be ejected with a slight "snap" while, at the same time, the reaction force created by the ejection of the plug 18 will be added to the manual pull on the needle 1 and assist in causing the flared end 17 of the catheter 16 to also "snap" into sealing position within the needle hub 4 and neck 6. As soon as the plug 18 is ejected, blood will flow therein, but a momentary time delay will result from the fact that the catheter 16 is not wholly filled with blood and must, therefore, fill up before it can overflow into the sac 13. This permits the person inserting the catheter 16 to constrict the catheter 16 to control the blood flow and thereby allow little or no loss of blood from the patient. This same "snap-action" facilitates the seating of the flared end 17 of the catheter 16 within the needle hub 4.

It will also be apparent that the sac 13 protects the catheter 16 and the covering sleeve 20 protects the needle 1 after the entire apparatus A has been assembled and sterilized. The catheter 16 may be easily manipulated through the sac 13 so as to shift the catheter 16 through the needle 1 and to the vein 24. The needle 1 is easily withdrawn along the catheter 16 and the needle hub 4 is readily attached to the fitting 28 for intravenous administration of fluids without contaminating or destroying the sterile condition of the flared end 17 of the catheter 16. As a result, fluid introduced through the tube 29 can be introduced into the vein 24 without becoming unsterile or contaminated and the possibility of inadvertently introducing an air embolism into the vein 24 is substantially avoided. It will also be apparent that the doctor, nurse, or technician, in using the apparatus A, will not be required to scrub or use sterile gloves as is ordinarily required in conventional venipuncture techniques heretofore in use. Moreover, the use of an arm board is eliminated since there is no necessity for a patient to have the appendage immobile except during installation or removal of the catheter 16.

Figure 13:
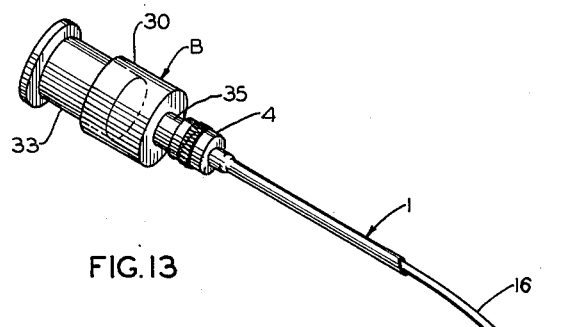
FIG. 13 is a fragmentary perspective view showing the anticoagulant injector in position over the end of the needle.
Figure 14:
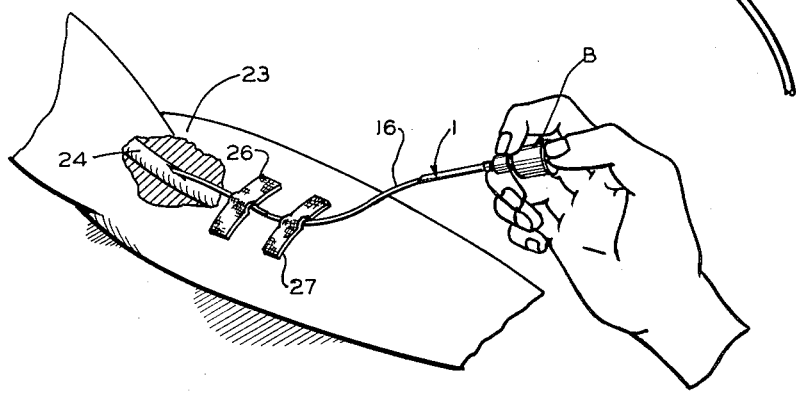
FIG. 14 is a perspective view showing the use of the anticoagulant injector.
Figure 15:
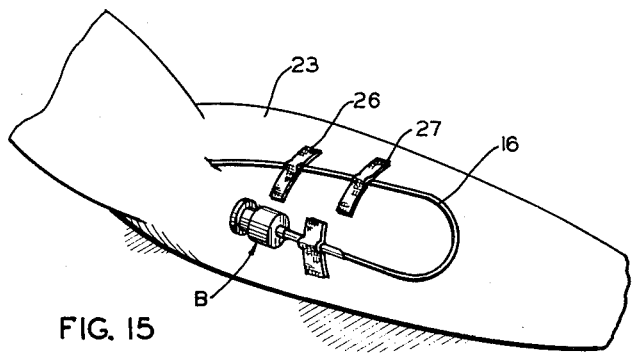
FIG. 15 is a perspective view showing the apparatus after the anticoagulant has been injected into the catheter.

When the initial injection or infusion has been completed, the fitting 28 is removed so as to disconnect the tube 29 from the needle 1 and the anticoagulant injector B quickly inserted in the following manner. The protector 37 of the anticoagulant injector 8 is removed and the discharge nipple 35 fitted within the needle hub 4, as shown in FIG. 13. However, prior to placing the discharge nipple 35 on the needle hub 4, the nurse or physician preferably should invert the injector B and depress the plunger 33 very slightly so as to preclude the possibility that any small air bubbles might be entrapped within the chamber 31 which might introduce an air embolism into the vein 24. After the anticoagulant injector B is installed on the needle hub 4, as shown in FIG. 8, the plunger 33 is depressed, forcing the anticoagulant 32 into the catheter 16. Preferably, the volume of anticoagulant 32 is slightly greater than the internal volume of the catheter 16 so that the catheter 16 is filled with the anticoagulant 32 and is substantially purged of blood. After the catheter 16 has been filled with anticoagulant 32, the catheter 16 cannot become clogged with clotted blood and the injector B may be taped to the arm 22, as shown in FIG. 15. As has been above noted, the anticoagulant injector B is fabricated of slightly flexible polyethylene and is so made that the plunger 33 will remain securely in place when depressed. Consequently, the injector B becomes a sealing plug for the catheter 16 and prevents any unauthorized reverse flow of fluids or blood through the catheter 16 during periods between actual use. Whenever it is subsequently necessary to use the catheter 16 for injection or infusion of fluids, the injector B can be removed and a fitting 28 reconnected to the needle hub 4, as previously described. As a result, the catheter 16 may be left in place for many days without reducing the freedom or mobility of the patient and, at the same time, the patient is spared the painful and harrassing experience of repeated and successive venipunctures.

It should be understood that changes and modifications in the form, construction, arrangement, and combination of the several parts of the apparatus for injecting or infusing fluids into patients and method of making same may be made and substituted for those herein shown and described without departing from the nature and principle of our invention.

Having thus described our invention, what we claim and desire to secure by Letters Patent is:

1. Apparatus of the character described comprising a hollow needle provided on one end with a hub, a ferrule fitted over said hub, a sleeve fitted over said ferrule, a pliable sac covering said sleeve and having one end confined between said sleeve and ferrule, and a flexible catheter positioned within said hollow needle and pliable sac and being shiftable in said needle by manual manipulation through said pliable sac.

2. Apparatus of the character described comprising a hollow needle provided on one end with a hub, a ferrule fitted over said hub, a sleeve fitted over said ferrule, a pliable sac covering said sleeve and having one end confined between said sleeve and ferrule, a flexible catheter positioned within said hollow needle and pliable sac and being shiftable in said needle by manual manipulation through said pliable sac, and a removable closure-element mounted in one end of the catheter.

3. Apparatus of the character described comprising a hollow needle provided on one end with a hub, a ferrule fitted over said hub, a sleeve fitted over said ferrule, a pliable sac covering said sleeve and having an open end folded back so as to lie between said sleeve and ferrule, and a flexible catheter positioned within said hollow needle and pliable sac and being shiftable in said needle by manual manipulation through said sac.

4. Apparatus of the character described comprising a hollow needle provided at one end with a hub, a ferrule removably mounted upon said hub and extending axially outwardly therefrom, a pliable sac mounted at one end upon said ferrule, a sleeve operatively securing the sac to the ferrule, said sac being sealed at its other end so that the interior thereof is protected against external contamination, and a flexible catheter positioned within said hollow needle and pliable sac, said catheter having one end slidably mounted in said needle and being shiftable therethrough by manual manipulation through said pliable sac.

5. Apparatus of the character described comprising a needle-like element having a tubular bore, said needle-like element also being provided at its distal end with a hub and being sharpened at its other end for insertion through the skin into a blood vessel of a patient, a tubular coupling sleeve removably attached to the distal end of the needle, an elongated pliable sac closed at one end and secured at its other end to the coupling sleeve, a flexible catheter positioned within the sac and having an external diametral size adapted for sliding movement through the tubular bore of the needle, said distal end of the needle being provided with a tubular sleeve-portion which extends into the coupling means and has an internal bore of larger diametral size than the outside diametral size of the catheter, and a plug press-fitted into the remote end of the catheter, said plug having a head larger than the internal bore of the sleeve portion, said plug further being shorter than the internal bore of the sleeve-portion so that, as the catheter is pulled through the needle-like element the head will engage the sleeve portion and the plug will be withdrawn from the catheter as a result of continued pulling action.

References Cited in the file of this patent

UNITED STATES PATENTS

| | | |
|---|---|---|
| 1,389,531 | Riche | Aug. 30, 1921 |
| 2,585,716 | Zaetz | Feb. 12, 1952 |
| 2,595,493 | Slaby et al. | May 6, 1952 |
| 2,680,440 | Fox | June 8, 1954 |
| 2,759,477 | Mains | Aug. 21, 1956 |
| 2,812,763 | Ferguson | Nov. 12, 1957 |
| 2,902,034 | Simmonds | Sept. 1, 1959 |
| 2,915,063 | Cutter | Dec. 1, 1959 |
| 2,937,643 | Elliot | May 24, 1960 |

FOREIGN PATENTS

| | | |
|---|---|---|
| 1,064,445 | France | Dec. 23, 1953 |

OTHER REFERENCES

Peterson et al.: "A Method for Recording the Arterial Pressure Pulse and Blood Pressure in Man," American Heart Journal, Vol. 37, No. 5, April 15, 1949 (pages 771–773), 128–215.